Patented Aug. 22, 1933

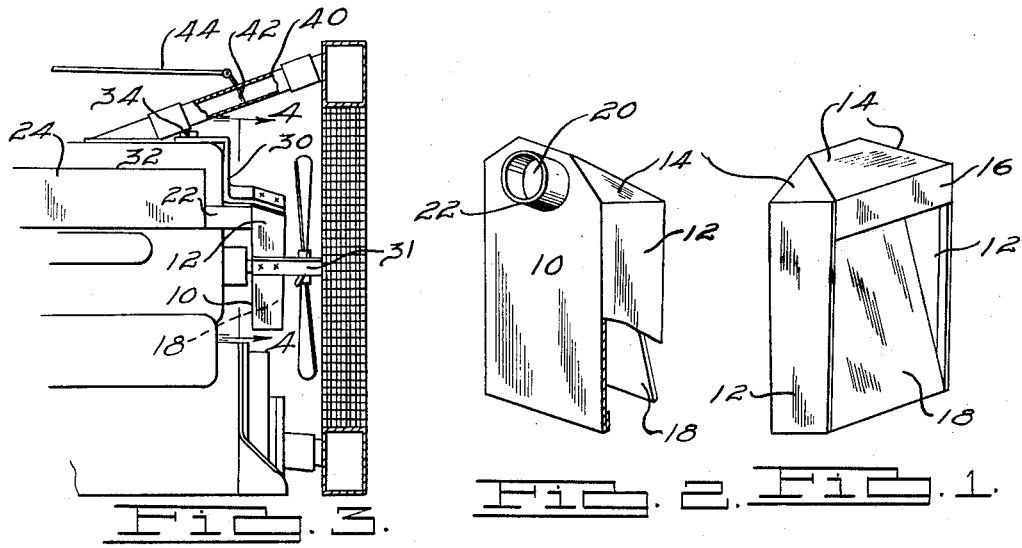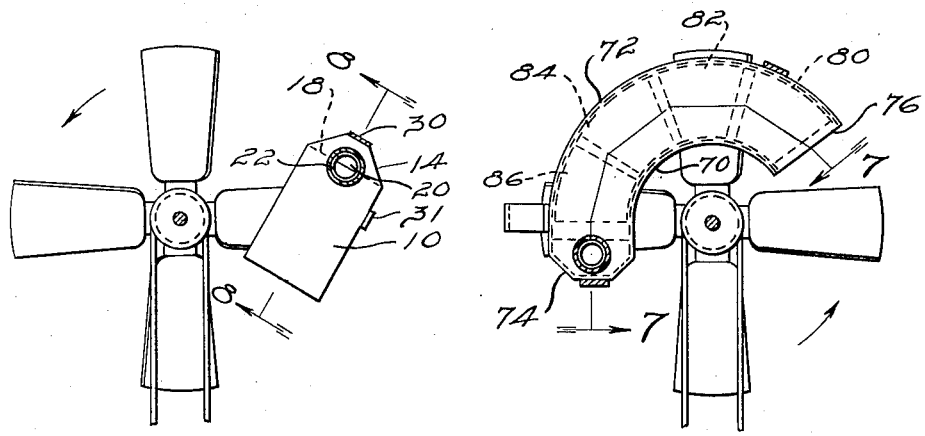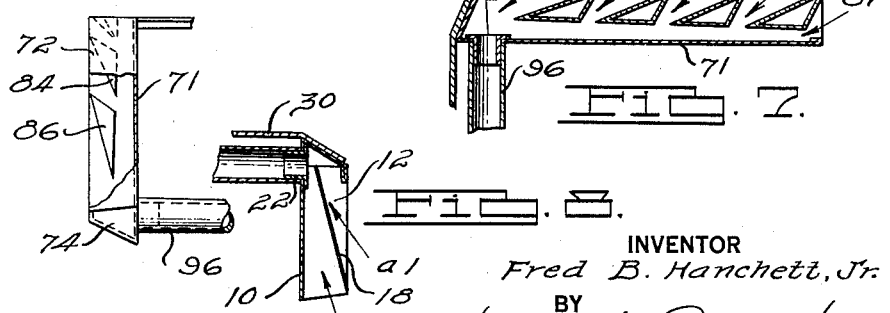

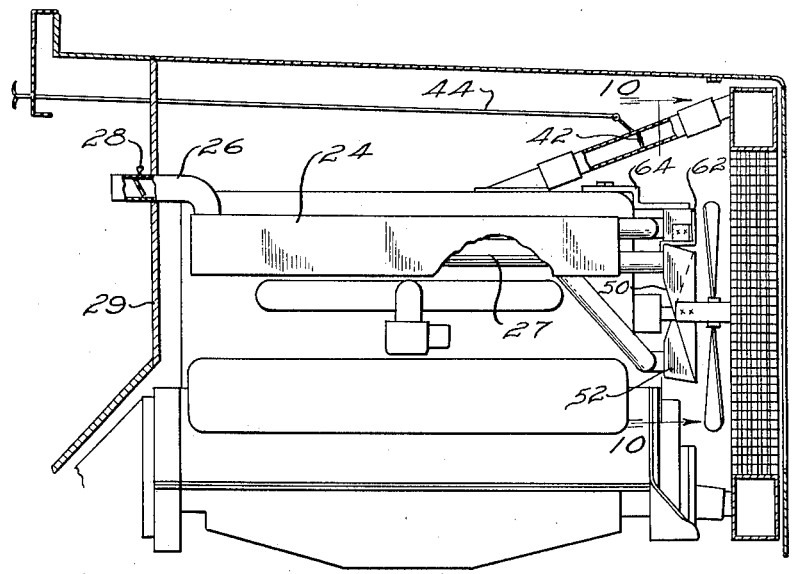
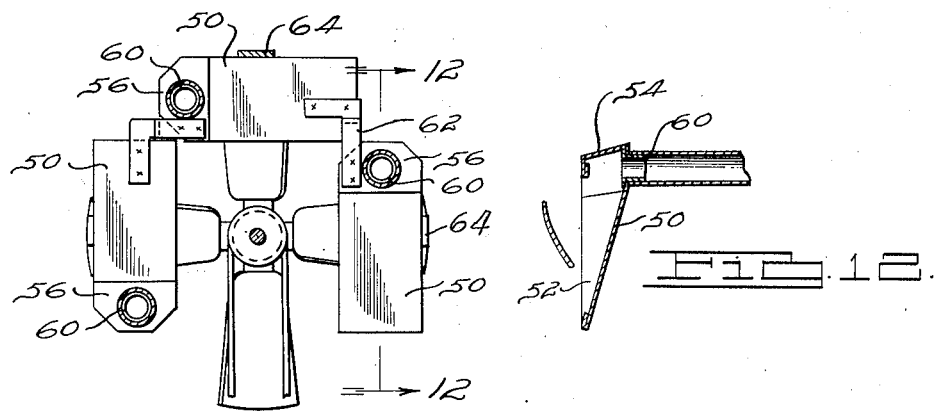
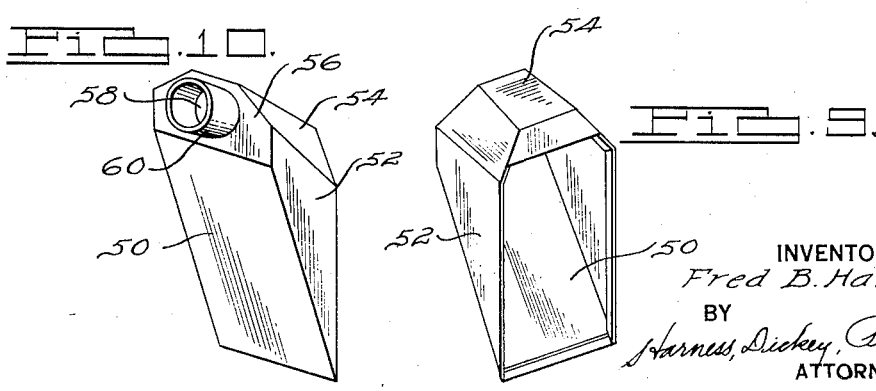

1,923,484

UNITED STATES PATENT OFFICE 1,923,484

AUTOMOBILE HEATER

Fred B. Hanchett, Jr., Royal Oak, Mich.

Application October 30, 1930. Serial No. 492,197

14 Claims. (Cl. 257—241)

The heater comprising the present invention is of the type which receives fresh air as it is drawn through the radiator of an automobile by the fan and by the forward motion of the motor vehicle upon which it is installed. The air thus received is passed over a heated surface in such a way as to receive heat therefrom. This heated air is then distributed in the passenger compartment of the vehicle. The exhaust manifold of a motor vehicle being an excellent source of heat and being readily accessible has long since invited the attention and ingenuity of inventors and many experiments involving the principles of heat transfer have been directed toward this source of heat. Likewise, the engine fan being situated as it is in an accessible position directly behind the radiator, has presented a source of fresh air for these experiments and, at the present time, there are numerous devices which seek to obtain air from this source and heat the same by direct contact with the exhaust manifold. As a general rule, it has been discovered that at high traveling speed, these devices will operate satisfactorily and the air passing through the fan will be blown directly into the funnel-shaped opening usually provided for the same, and will be carried past the exhaust manifold into the interior of the car. It is found, however, that at low engine speeds, and when the vehicle is not in rapid motion, such devices cease to function. The practicability of these devices must necessarily depend alone upon their ability to heat the interior of the car as rapidly as possible after the occupants of the car are seated, and since, especially in cities where traffic is heavy, the operator of a motor vehicle seldom has the opportunity or inclination to enter his car and travel to his destination at a high rate of speed, devices of this nature have not given good satisfaction. The dissatisfaction that has been attendant upon devices of this nature has given rise to this invention, and accordingly the paramount object of the present invention is to provide a heater which at all times receives the full benefit of the air blast from that portion of the fan to which it is exposed, regardless of the speed of rotation of the fan or the speed of travel of the motor vehicle.

Actual windage experiments have demonstrated that the air drawn into and distributed by a fan rotating at low speed whirls, for the most part, around the fan rather than being blown rearwardly as is the general supposition. As the rate of speed of the vehicle is increased, less of this air follows around with the fan and more is thrown rearwardly, so that the air in leaving the fan at a slightly increased rate of fan speed is distributed in the path of a cone of obtuse angularity. As the speed of the vehicle is gradually increased, the angularity of this cone of distributed air, decreased until at high vehicle speed, most of the air is thrown rearwardly of the fan in an axial direction as though the fan were encased within a wind tunnel. The present invention has taken advantage of this phenomena of wind distribution from a fan. A collecting head has been provided which is designed to receive the full blast of air issuing from an area of the fan to which it is exposed, regardless of the direction of air flow from the fan. The head comprising the present invention may be employed as an attachment for any of the heaters of this type, or it may be employed as a built-in unit in a heater construction, but in either case the essential features of the invention are preserved.

In the accompanying two sheets of drawings, forming a part of this specification, several embodiments of the improved heater funnel have been shown and in these drawings:

Figs. 1 and 2 are front and rear perspective views, respectively, of the preferred form of heater collecting head. In these two views certain parts have been broken away to more clearly reveal the nature of the invention.

Fig. 3 is a side elevation of a motor vehicle engine showing the preferred form of heater assembly mounted thereon.

Fig. 4 is a rear elevation of the preferred form of heater head showing the same properly positioned with respect to a fan from which it receives air currents.

Fig. 5 is a back view showing a modified compounded type of heater head properly positioned with respect to a fan.

Fig. 6 is a partially broken end view of Fig. 5.

Fig. 7 is a sectional view taken substantially along the line 7—7 of Fig. 5.

Fig. 8 is a sectional view taken substantially upon the line 8—8 of Fig. 4.

Figs. 9 and 10 are respectively front and rear perspective views of a still further modified form of heater collecting head.

Fig. 11 is a rear elevation of a plurality of the heater heads shown in Figs. 9 and 10 properly positioned with respect to an automobile fan.

Fig. 12 is a sectional view taken substantially along the line 12—12 of Fig. 11, and Fig. 13 is a side elevation of a motor vehicle engine showing a heater assembly employing a number of heater collecting heads.

In all of the above described views like characters of reference are employed to designate like parts throughout.

In the forms of the invention shown in Figs. 1 and 2 the heater collecting head is generally in the form of a rectangular, box-like structure formed of light sheet material having a rear wall 10, and side walls 12. One end of the structure is closed by means of inclined walls 14 giving this end of the structure a pyramidal appearance. The structure is open on one side and a narrow wall 16 extends across the top of the structure between the two sides 12 on the open side of the structure. This wall, together with the closures 14, forms a hood that catches and retains the air which is forced into the structure. A baffle 18 also formed of light sheet material extends between the walls 12 and this baffle has its lower edge extending across the front of the structure at its lower extremity. The baffle is inclined inwardly and upwardly of the structure and terminates at its upper edge on a line spaced from the rear wall 10 and preferably about midway of outlet opening 20. The opening 20 is provided in the rear wall 10 adjacent the top of the structure and this opening communicates with a conduit 22 which conducts the entrapped air into the heater 24 which surrounds the exhaust manifold 27. This heater is and may be of any conventional type and no claim is made as to its novelty. The air within the heater is expelled through an outlet conduit 26 into the passenger compartment 29.

The rigidity of the conduit 22, which is attached to the heater, may be sufficient to support the device in position adjacent the fan. However, as an additional supporting means, brackets 30 may be secured to the cylinder head 32 by one of the cylinder head bolts which is shown at 34. This bracket has one end spot-welded or otherwise secured to the top of the device, as clearly shown in Fig. 3. Brackets 31 may also be secured to the sides of the device and to a stationary part of the vehicle.

The device is positioned directly behind the fan with its open side opposing the fan in parallel relation thereto and preferably about one-fourth inch (¼'') therefrom and in such a manner that, upon rotation of the fan, the blade approaches the open end of the device. Preferably, the device is positioned to oppose the outer area of the blade as these areas are the most effective ones, and preferably with the leading edge of the head radial to the fan, as indicated in Fig. 4. At low speeds the air which is thrown around with the fan will be picked up by the device by virtue of its ability to trap this air. Such air as passes over the front of the baffle will enter the conduit 22 directly as shown by the arrow $a_1$, while such air as enters the device behind the baffle 18 will be given an increased velocity due to the restriction between the edge of this baffle and the rear wall 10 of the device. Such air will travel over the path $a_2$ and will join the air traveling over the path $a_1$. The hood-like closure 14—16 will entrap the air which has entered the device and the same will escape through the conduit 22. The inclination of the baffle 18 is such that at low speed the air which ordinarily would travel around with the fan will be gently deflected by this baffle into the hood-like closure and thus the baffle 18 is so positioned as to lie substantially parallel to the path of air as thrown from the fan at low speed. I have found in practice that the most effective angle for this inclined wall to obtain the greatest air flow at idling speeds of the engine is about 15° with respect to the plane of rotation of the fan, and should not exceed 45° where a maximum flow of air is desired at low speeds. At high vehicle speed the air will approach the baffle more directly and the outer surface of the baffle will deflect the air upwardly into the hood. At high speed less air will enter through the path $a_2$ and more air will enter through the path $a_1$. At low speed the reverse is true.

In Fig. 3 the water connection between the radiator and the cylinder head is designated at 40. This connection is provided with a valve 42 operable through a rod 44. Normally, this valve 42 remains open, but upon closure of this valve when the engine is first started, premature heating of the engine may be effected by stopping circulation of water through the radiator. When this premature heated condition has been attained the valve 42 may be opened and heated water allowed to flow into the radiator. This permits a quick means of heating up the engine so as to obtain a quick supply of hot air through the heater.

In Figs. 9, 10, 11 and 12 a modified form of the invention is disclosed. In this form of the invention the air collector is in the form of an open-ended irregular shaped pyramid having an inclined wall 50, sides 52, a hood shaped top 54 and an end 56, all of which are formed of light sheet material. The end 56 is provided with an opening 58 communicating with a conduit 60 leading to the heater. The open side of the device is positioned adjacent the fan and is oriented in the same manner as the preferred form of the device. The hood portion 54 acts as a trap to deflect the air which normally would travel around with the fan, or be thrown rearwardly through it.

In Fig. 11 a plurality of these devices have been shown and their respective conduits may be united into a single conduit for conducting air into the heater, or if desired, they may each be connected to the heater. The devices are connected together by brackets 62 and they may each be supported by brackets 64 from a stationary part of the engine, or the vehicle. Each of the devices is oriented with respect to the fan so that the approaching blade passes over the open side of the device toward the hood as shown by the arrows in Fig. 11.

In the form of the device shown in Fig. 5, the air-collecting head is generally of arcuate shape. The device has an inner side 70 and an outer side 72, and a hood-shaped end 74. The end 76 of the device is open. A plurality of triangular-shaped baffles 80, 82, 84, and 86 are suspended between the two sides 70 and 72. These baffles each have a side extending generally in the direction of the back 71. The front of the device is open and the various sides of the triangular shaped members form between themselves a plurality of passageways 88, 90, 92 therebetween. One side of the triangular shaped member 86 forms with the hood 74 a passageway 94 leading directly to the outlet 96. The triangular shaped devices progressively have their inner side spaced from the back 71 and increasing distance in order that air entering the passageways 88, 90, 92 and 94 may be combined and accommodated. As shown in Fig. 7, the end of the device comprising the hood 74 is open providing a passageway 87. The device is mounted as shown in Fig. 5 rearwardly of the fan and the air which at low speed travels with the fan is picked up and passed through the various passageways to the conduit 96. At higher rates of speed the air is blown more directly onto the baffle members 80, 82, 84 and 86 but is deflected through the various passageways at an increased speed. The conduit 96 is connected to the heater 24 in the usual manner, and thus all the localized air is carried through the heater and into the interior of the car. Each compartment unit in this form of device operates essentially the same as in these single units previously described.

While I have shown the devices in the accompanying drawings as each being provided with a hood-like portion at the discharge end, it is not to be understood that this is essential in the broader aspects of the present invention, as I have found that if the end wall at the discharge end is positioned in a plane approximately parallel to the axis of the fan, effective results are still obtained, and which results are impossible where such wall or corresponding portion extends away from the discharge opening in a direction opposite to the mentioned inclined wall.

This device is decidedly inexpensive to manufacture and may be formed from left-over strip stock which would ordinarily be discarded, thus saving in the cost of manufacturing.

The invention is not to be limited to the exact arrangement of parts shown in the accompanying two sheets of drawings and as described in this specification. Only insofar as the invention has been particularly pointed out in the accompanying claims is the same to be limited.

I claim:

1. In combination with an automobile heater of the type which receives a supply of air from an automobile fan, of an air-receiving member comprising a substantially rectangularly shaped boxlike structure positioned directly behind the automobile fan, said structure being provided with an open side of relatively great area disposed parallel to the plane of rotation of the fan and an open end of relatively small area disposed substantially normally to the plane of rotation of the fan and in a plane passing through the axis of rotation of the fan.

2. The combination with an automobile heater of the type which receives a blast of air from an automobile fan of a boxlike structure having a conduit leading therefrom to the heater, said structure having an open side and an open end, said structure being positioned directly behind the automobile fan with said open side opposing the blade and the open end facing the oncoming blade, a baffle in said boxlike structure positioned to direct rotating air following the motion of the blades of said fan into the end of the structure and to direct air flowing rearwardly from said fan into the end of said structure.

3. The combination with a heater of the type adapted to receive air from an automobile fan, of a box-like structure, a conduit leading from said structure, said structure being provided with an open side positioned in opposed relation to the outer ends of the fan blades and a baffle in said structure extending from the edge of said open side remote from said conduit to a point adjacent the conduit.

4. The combination with a heater of the type adapted to receive air from an automobile fan of a box-like structure, a conduit leading from said structure, said structure being provided with an open side positioned in opposed relation to the outer ends of the fan blades, an open end adjacent said open side, and a baffle in said structure extending from the edges of said open side and end remote from said conduit to a point adjacent the conduit.

5. In an automobile engine having a cooling fan and a manifold heater, of a collector head for entrapping air and passing the same to the heater, said head having a baffle therein for directing air rotating with the oncoming blades of said fan into the head on one side of the baffle, and for directing air issuing rearwardly from passing blades by screw action of the blades into the head on the other side of the baffle.

6. In an engine of a motor vehicle having a cooling fan, an air collector head comprising a member having an open face positioned substantially parallel to the plane of rotation of said fan and in close proximity thereto, side walls for said member extending rearwardly from said plane, and an inclined wall between said side walls extending from the front edges thereof at that end of the head most advanced against the direction of rotation of said fan to a line rearwardly of the fan spaced from the front edges, the inclination and direction of said wall with respect to the plane of rotation of said fan being approximately the inclination of the air stream from said fan at engine idling speeds, and a conduit for discharging air from said head.

7. The combination with an automobile fan of a plurality of collector heads positioned directly behind said fan, each head having a baffle therein, the inclination and direction of which is with respect to the direction of rotation of the fan approximating the inclination and direction of the air stream from said fan at engine idling speeds, and conduits from said heads leading to a common heating surface.

8. The combination with an automobile fan of a plurality of connected collector heads positioned directly behind said fan, each head having a baffle therein, the inclination and direction of which is with respect to the direction of the air stream from said fan at engine idling speeds, and conduits from said heads leading to a common heating surface.

9. In an automobile engine having a cooling fan and a heating device adapted to deliver heated air to the passenger compartment of the automobile, of a collector head connected with said device and adapted to deliver air from said fan thereto, said head comprising a hollow structure proximate to said fan and having an open end opening in a plane approximately parallel to the plane of rotation of said fan and in a direction opposite to the direction of movement of the blades of said fan relative thereto.

10. In an automobile engine having a fan and a heater, of a box-like collector head positioned adjacent said fan and provided with an open side and an open end to receive both rotationally and axially directed air moved by said fan, said head including a wall opposite said open end and inclined with respect to the plane of rotation of the fan and toward said open side to prevent the escape of air from said open side.

11. A collector head adapted to receive air from the cooling fan of an automobile comprising a box-like structure having an open forward face, an open end, a hood-like portion opposite the open end, a rearwardly extending conduit adjacent the hood-like portion, a baffle disposed in the structure and being directed diagonally rearwardly and terminating under the hood in such manner as to deflect air entering at either the forward face or at the open end of the structure into the rearwardly extending conduit.

12. A collector head for deflecting air from a cooling fan of an automobile into a conduit leading to a heater chamber, comprising an approximately arcuate box-like structure adapted to be disposed in a plane parallel to the fan and adjacent to the outer ends of the blades thereof and having an open forward face and a series of radially arranged baffles disposed in the structure and terminating forwardly of the rear wall of the structure.

13. A collector head for receiving air from the cooling fan of an automobile and supplying the air to a heater, comprising a casing having a wedge like cavity formed in the forward face thereof and disposed with a broad open side thereof approximately parallel to the plane of the fan and with the edge of the wedge presented approximately to the blast of air whirling with the fan, the rear wall of the cavity being inclined rearwardly and adapted to intercept the axial flow of air and direct it rearwardly into a conduit leading to the heater, a transverse baffle disposed across the cavity to intercept the flow of air moving parallel with the plane of the fan and along the rear wall of the cavity, the transverse wall being disposed upon the side of the conduit opposite to the rear wall to prevent the air from passing over the mouth of the conduit.

14. In an engine of a motor vehicle having a cooling fan, an air collector head comprising a member having an open face positioned approximately parallel to the plane of rotation of said fan and in close proximity thereto, an inclined rear wall portion for said member extending from the front edges thereof at that end of the head most advanced against the direction of rotation of said fan to a line disposed rearwardly of the fan and spaced rearwardly of said front edges, side wall portions connecting said front edges and said rear wall portion, a top wall portion, the inclination and direction of said rear wall portion with respect to the plane of rotation of said fan being approximately the inclination of the air stream from said fan at engine idling speeds, and a conduit for discharging air from said head, the inclination and position of said top wall portion being such as to co-operate with air carried along said rear wall portion to direct said air into said conduit.

FRED B. HANCHETT, Jr.